Nov. 10, 1970  J. GOETZKE  3,539,539
METHOD FOR EXTRACTING LOWER MOLECULAR COMPONENTS
FROM GRANULATED POLYAMIDES
Original Filed Feb. 16, 1967

INVENTOR.
JUERGEN GOETZKE
BY Bair, Freeman &
Molinare Attys.

United States Patent Office 3,539,539
Patented Nov. 10, 1970

3,539,539
METHOD FOR EXTRACTING LOWER MOLECULAR COMPONENTS FROM GRANULATED POLYAMIDES
Juergen Goetzke, Frankfurt am Main-Bockenheim, Germany, assignor to Vickers-Zimmer Aktiengesellschaft, Planung und Bau von Industrieanlagen, a corporation of Germany
Original application Feb. 16, 1967, Ser. No. 616,698, now Patent No. 3,423,183. Divided and this application May 31, 1968, Ser. No. 733,624
Int. Cl. C08g 20/14
U.S. Cl. 260—78       1 Claim

ABSTRACT OF THE DISCLOSURE

An upright extraction tube which removes lower molecular components from granulated polyamides by the use of solvents, has a plurality of restriction means in the tube. The granulated polyamides are introduced at the upper end of the tube while the solvents are introduced at the lower end of the tube and the narrowest portion of the restriction means causes the upward flow of the solvent at that point to be at least equal to counterflow currents of the solvent.

CROSS REFERENCE TO RELATED APPLICATION

This is a division of Ser. No. 616,698, filed by Juergen Goetzke on Feb. 16, 1967, for an Extraction Tube for Extracting Lower Molecular Components From Granulated Polyamides, now Pat. No. 3,423,183.

BACKGROUND OF THE INVENTION

Field of the invention and description of the prior art

This invention relates to a method for continuously removing lower molecular materials from granulated polyamides.

It is well known that polyamides, particularly those of the type of poly-ε-caprolactam, contain after completion of polymerization considerable amounts (up to 12% by weight) of the starting monomers as well as small amounts of oligomers. The oligomers are troublesome since the mechanical properties of the products of polymerization, particularly nylon threads and fibers, are severely impaired. It is therefore common to reduce the content of lower molecular components by extraction with solvents, preferably water, to lower concentrations of, for example, about 0.5% by weight.

It has been the usual practice to perform such extractions discontinuously in large washing boilers or continuously in extraction towers. The discontinuous extraction processes have the known drawbacks of down time on opening, closing, and charging the extraction installation, and low efficiency due to waste of input energy because of periodic reheating for each batch.

In usual continuous extraction processes, the granulate is introduced into an extraction tube at the top and hot water enters at the bottom thereof and flows upwardly counterflow to the polyamide particles. During the downward movement of the particles in the water stream, the extraction of the lower molecular components occurs. At the bottom of the extraction tube the granulate is discharged, while the water which has become charged with lower molecular components is drawn off at the upper part of the extraction tube. Inside the elongated extraction tube, counterflow currents are set up because of density fluctuations in the water. The density fluctuations occur for various reasons. Sometimes the density varies because of excessive heating, for example, along the heated wall. It also increases because of cooling in the upper part of the tube upon entry of the considerably colder polyamide cuttings. These temperature variations result in corresponding convection currents. Upon charging of the water with the heavier lower molecular components, especially monomers, the density increases in the main flow direction of the water, which is an additional cause for counterflow currents. The total result of the counterflows of current causes the solvent, severely charged with monomers, to flow down from the upper zones of the extraction tube to the inlet of the fresh water. Because of these interference currents, the counterflow principle of the extraction and thereby the washing effect are seriously disturbed so that in the conventional extraction tubes, to sufficiently free the cuttings of the monomers, very large amounts of water are necessary. The maximum monomer concentration in the extraction tubes is about the middle so that the upper half of the tube remains virtually unused.

SUMMARY OF THE INVENTION

It is therefore an important object of the invention to eliminate the disadvantages of prior art methods of extracting lower molecular components from granulated polyamides.

It is also an object of the invention to provide a method for extraction which is simple and economical, yet highly efficient.

Further purposes and objects of the invention will appear as the specification proceeds.

It has been found that the objects of the invention may be accomplished by localization of secondary counterflows inside the extraction tube, whereby a more efficient and more extensive removal of the lower molecular substances from the polyamide cuttings is achieved. This is accomplished by providing a plurality of installations over the height of the extraction tube for constricting the flow cross section of the extraction tube. The flow cross sections are chosen so that the upward flow of the solvent in the narrowest tube cross sections is equal to or greater than the counterflow of the solvent resulting from temperature variations and charging of the solvent with lower molecular components and/or forced counterflow of the solvents.

These constrictions in the tube increase the flow rate of the solvent flowing in the tube. Experimentally, it has been found that the effect of improving the elutriation manifests itself effectively only if the narrowest of the flow cross sections are chosen so that the upward flow of the solvent in the constrictions is equal to or greater than the counterflow currents due to convection or density variations upon charging the solvent with lower molecular components. The constrictions in the tube act to block the downwardly directed interference currents of the solvent above the particular constriction in the tube.

A particular advantage of the invention is that the counterflow currents, which are actually desirable for intensifying the elutriation by providing good intermixing of granulate and solvent are not prevented, but rather are only localized. To provide further intensification of elutriation, additional streams created by suitable agitation or mixing assemblies may be utilized. In this case, the constrictions in the tube are dimensioned so that the upward movement of the solvent at the constrictions is equal to or greater than the counterflow of the solvent due to fluctuations in density and/or the forced counterflow of the solvent.

The size of constriction in the tube that is required for the desired blocking effect is readily calculated for each specific case from the mean flow velocity of the solvent and the flow brought about through density fluctuations of the solvent resulting from temperature variations and charging of the solvent with lower molecular components and/or a forced flow. The size of the constriction is limited upon adversely affecting the downward movement of the cuttings by reason of excessive solvent acceleration.

The extraction method according to the invention has many advantages. In comparison with conventional methods, and with equal granulate throughput and equal conventional apparatus dimenisons, to provide equal end monomer content in the granulate, much smaller amounts of solvent are required in the invention method, for example, only about 50% to 70% of the amount normally required. In addition to the saving in solvent, there is also an improved working of the extraction agent for the recovery of monomers because of the more concentrated collection thereof in water.

With equal amounts of water and like other conditions, the final concentration of the polyamide cuttings in caprolactam, using the method of the invention, amounts to, for example, 0.3% by weight as compared to 1% to 1.5% by weight in the extraction in conventional apparatus. Furthermore, with the invention, a smaller extraction unit accomplishes the same final concentration in caprolactam as in a conventional extraction tower with the same amount of solvent. Further, it is important that the extraction method according to the invention, particularly in the case of operational disturbances, such as breakdown of the heating system and pressure loss in the solvent feed, has a more stable opearting behavior than conventional extraction methods.

BRIEF DESCRIPTION OF THE DRAWINGS

Particular embodiments of the apparatus used in practicing the method of the present invention are illustrated in the accompanying drawings, wherein.

DESCRIPTION OF THE PREFERRED EMBODIMENTS

Figure 1:
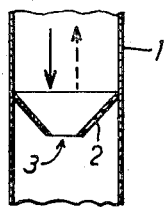
FIG. 1 is a fragmentary, side elevational view of an extraction tube made utilizing the method of the invention.

FIG. 1 shows an insert 2 being a funnel-shape shell truncated in the shape of a cone shell which narrows in the direction of movement of the granulate, which construction is advantageous in the case of a circular cross section extraction tube 1. The narrowing of the flow path is designated by the numeral 3. In the case of rectangular tubes, on the other hand, the installations are preferably in the shape of truncated pyramid shells. The direction of movement of the granulate is indicated by the arrow drawn in solid lines, while the arrow shown in broken lines shows the direction of flow of the solvent.

There are also other forms of construction, such as, for example, simple horizontal plates with corresponding restricted central apertures (not shown).

Figure 2:
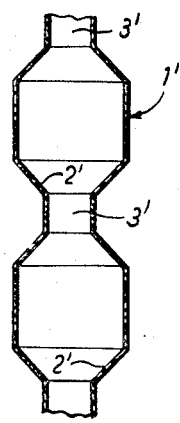
FIG. 2 is a fragmentary, side elevational view of another extraction tube embodiment.

The restricted portions 3' may also, as shown in FIG. 2, be formed by funnel-shaped contrictions 2' defined in the outer wall of the extraction tube 1' itself, so that additional constricting inserts are unnecessary. In the funnel-shaped constrictions 2' the use of the shown opposed double-funnel arrangements, with opposed aperture directions and meeting at the conical or pyramidal apexes of the funnel portions 2', are particularly advantageous since neither the flow of the solid matter nor that of the solvent is disturbed. In order to make a commercial scale extraction apparatus, for example, with funnel-shaped constrictions readily accessible for repairs and for the purpose of cleaning, short funnels with correspondingly large access openings, about the size of manholes, may be used.

Figure 3:
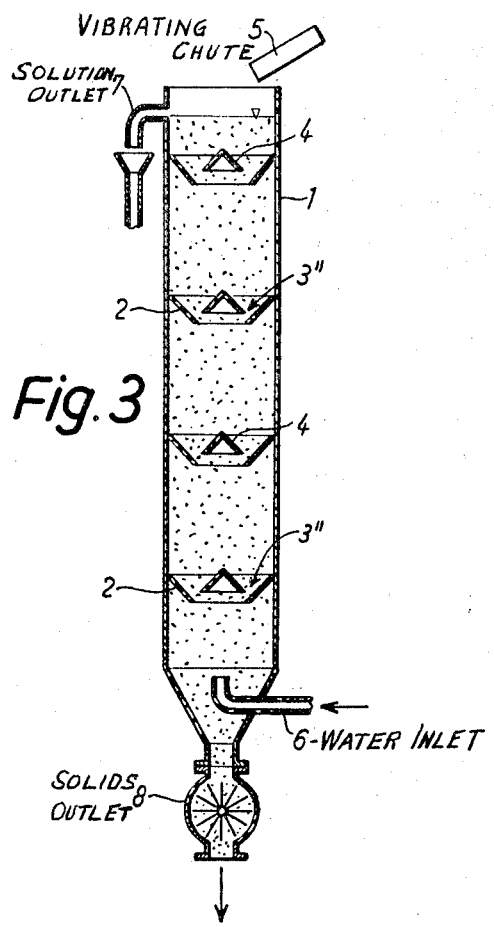
FIG. 3 is a side elevational view of still another extraction tube embodiment.

In order to assure an adequate cross-sectional constriction, as shown in FIG. 3, relatively small conical caps 4 are positioned in the funnel apertures so that the apex of the cone of the cap 4 is directed opposite to the direction of movement of the granulate. With this construction, the constriction 3'' is annular. These conical caps 4 are secured to suitable brackets (not shnwn) so that they can be swung out or removed. In this arrangement, operating personnel may pass through the funnel aperture for repair work. Such a construction of the extraction tube 1 for the extraction of poly-ε-caprolactam is shown in FIG. 3. The extraction tube 1 contains funnel-shaped installations 2 of particularly restricted height and with corresponding removable conical caps 4, so that four annular flow constrictions 3'' are provided. The extraction tube according to the invention can be provided in a known manner with an outer insulating jacket and/or heating jacket (not shown). The operation of the extraction tube is best explained by describing a specific example of execution. Through a vibrating chute 5, about 15 kg. of granulate per hour was introduced into the top of the tube 1. The inlet temperature of the granulate was 40° C. and the concentration of the granulate in the caprolactam was 10% by weight. The granulate or cuttings remained in the tube 1 for about 20 hours. Through a pipe line 6 water was fed into the tube 1 at a temperature of about 110° C. The throughput of water was 15 kg./hr. An overflow 7 directed the water, charged with 10% by weight of caprolactam, out of the tube at a temperature of about 90° C. The cuttings were discharged after completion of the extraction with the aid of a cell wheel sluice 8 and were dried in a conventional manner. The discharge temperature of the granulate was 100° C. The final concentration of monomers in the granulate amounted to 0.5% by weight. At this concentration, threads with good properties can be readily made.

A conventional extraction tube without the constrictions of the invention yielded, with operating conditions otherwise the same, a granulate with a monomer content 1% to 1.5% by weight. This amount of monomers is above the concentration required for the production of high quality threads.

I claim:

1. In an upright extraction tube having a single water solvent inlet at its lower end, a single solids outlet at its lower end, a single solution outlet at its upper end, an improved process for using water solvent to extract monomers and oligomers from a mixture of said monomers and oligomers with a highly polymerized, granulated poly-ε-caprolactam comprising the steps of:
   introducing said mixture only at the top of said upright extraction tube, said mixture providing a downward flow directed in the vertical, downward direction within said tube;
   introducing said solvent only at the opposite end of said upright extraction tube to provide an upward flow of solvent in said tube, said downward flow and said upward flow giving rise to currents of counterflow of said solvent in the downward direction;

restricting all of said flows at a plurality of positions along said vertical tube such that the rate of said upward flow of said solvent is at least equal to the rate of said counterflow currents of said solvent in the downward direction at each and every restricted position in said tube;

drawing off solvent saturated with said monomers and oligomers only at the top of said tube; and drawing off granulated poly-ε-caprolactam having the monomers and oligomers removed only from the bottom of said tube.

References Cited

UNITED STATES PATENTS 3,374,207  3/1968  Ryffel et al. _____ 260—96 XR

JOSEPH L. SCHOFER, Primary Examiner

W. HAMROCK, Assistant Examiner

U.S. Cl. X.R.

23—270; 260—88.3, 96